(12) United States Patent
Yoshiuchi et al.

(10) Patent No.: US 8,116,782 B2
(45) Date of Patent: Feb. 14, 2012

(54) COMMUNICATION QUALITY CONTROL SYSTEM

(75) Inventors: Hideya Yoshiuchi, Beijing (CN); Masashi Yano, Kawasaki (JP); Hitomi Nakamura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 393 days.

(21) Appl. No.: 12/518,474

(22) PCT Filed: Feb. 28, 2007

(86) PCT No.: PCT/JP2007/054377
§ 371 (c)(1),
(2), (4) Date: Jul. 9, 2009

(87) PCT Pub. No.: WO2008/105106
PCT Pub. Date: Sep. 4, 2008

(65) Prior Publication Data
US 2010/0062787 A1 Mar. 11, 2010

(51) Int. Cl.
*H04W 72/04* (2009.01)
(52) U.S. Cl. ............ 455/452.2; 455/456.5; 455/424; 370/332; 370/328; 709/226; 709/224; 709/228
(58) Field of Classification Search .......... 455/450–453, 455/446–447, 464, 436–444, 456.5, 33.2, 455/561
See application file for complete search history.

(56) References Cited

U.S. PATENT DOCUMENTS
2002/0184510 A1 12/2002 Shieh
2005/0083909 A1 4/2005 Kuusinen et al.
2006/0209891 A1* 9/2006 Yamada et al. ............... 370/468
2006/0215683 A1* 9/2006 Sukkar et al. ................ 370/437
2008/0117869 A1* 5/2008 Freen et al. .................... 370/329

FOREIGN PATENT DOCUMENTS
JP 2004-266310 A 9/2004
WO 02/085055 A2 10/2002
WO 2004/077754 A1 10/2004
WO 2005/039132 A1 4/2005

OTHER PUBLICATIONS

3rd Generation Partnership Project 2 "3GPP2" X.S0013-002-0, Version 1.0, All-IP Core Network Multimedia Domain, Dec. 2003.
3rd Generation Partnership Project 2 "3GPP2" X.S0013-012-0, Version 1.0, All-IP Core Network Multimedia Domain, Dec. 2007.

* cited by examiner

*Primary Examiner* — Kent Chang
*Assistant Examiner* — Keith Fang
(74) *Attorney, Agent, or Firm* — Mattingly & Malur, PC

(57) ABSTRACT

The present invention implements communication control with user's service subscription information reflected in a mobile communication network. A QoS control server for providing a communication quality control function of a network, a user information management server for managing user's service information, a service proxy server for transferring a service control message transmitted by a user to a service control server, a service relay server for relaying a message between service control servers in two different networks, and a service control server for exercising service control based on user service information are included. In user service start processing, the service control server or service relay server transmits a service control message inclusive of service subscription information acquired beforehand to the service proxy server. The QoS control server acquires the service subscription information from the service proxy server. Thus, subscriber information is reflected to communication quality control processing.

10 Claims, 16 Drawing Sheets

FIG.4
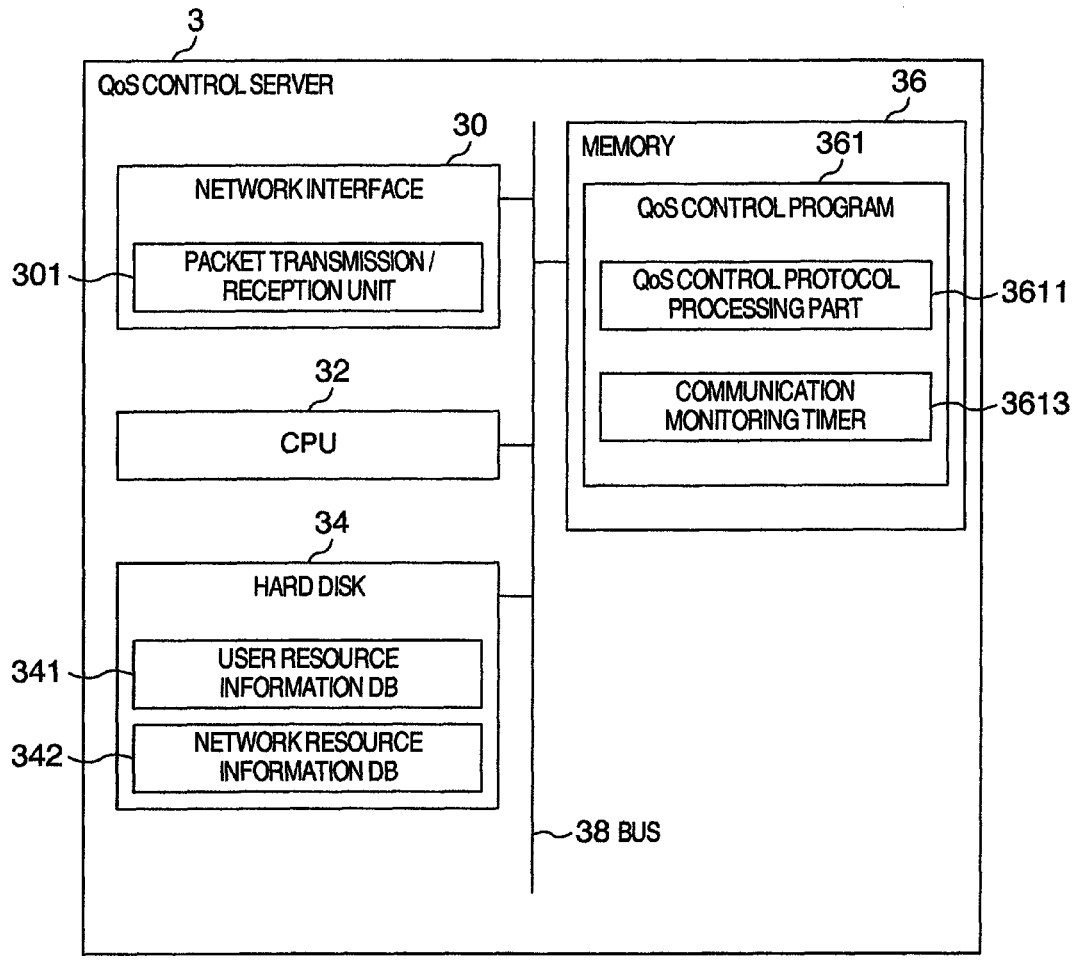
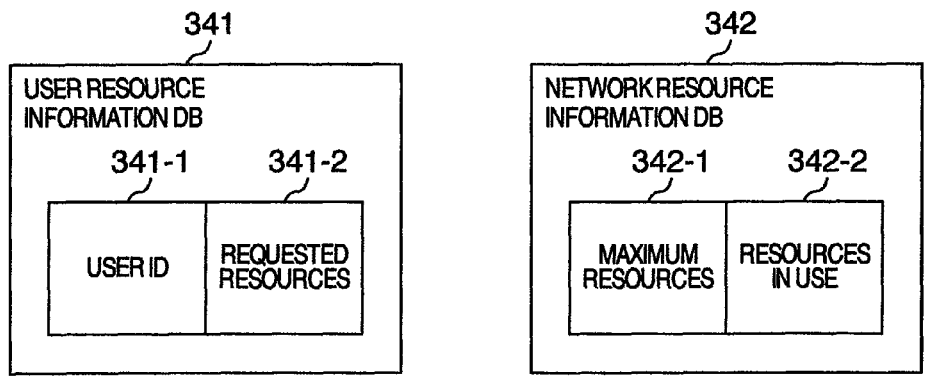

FIG.5
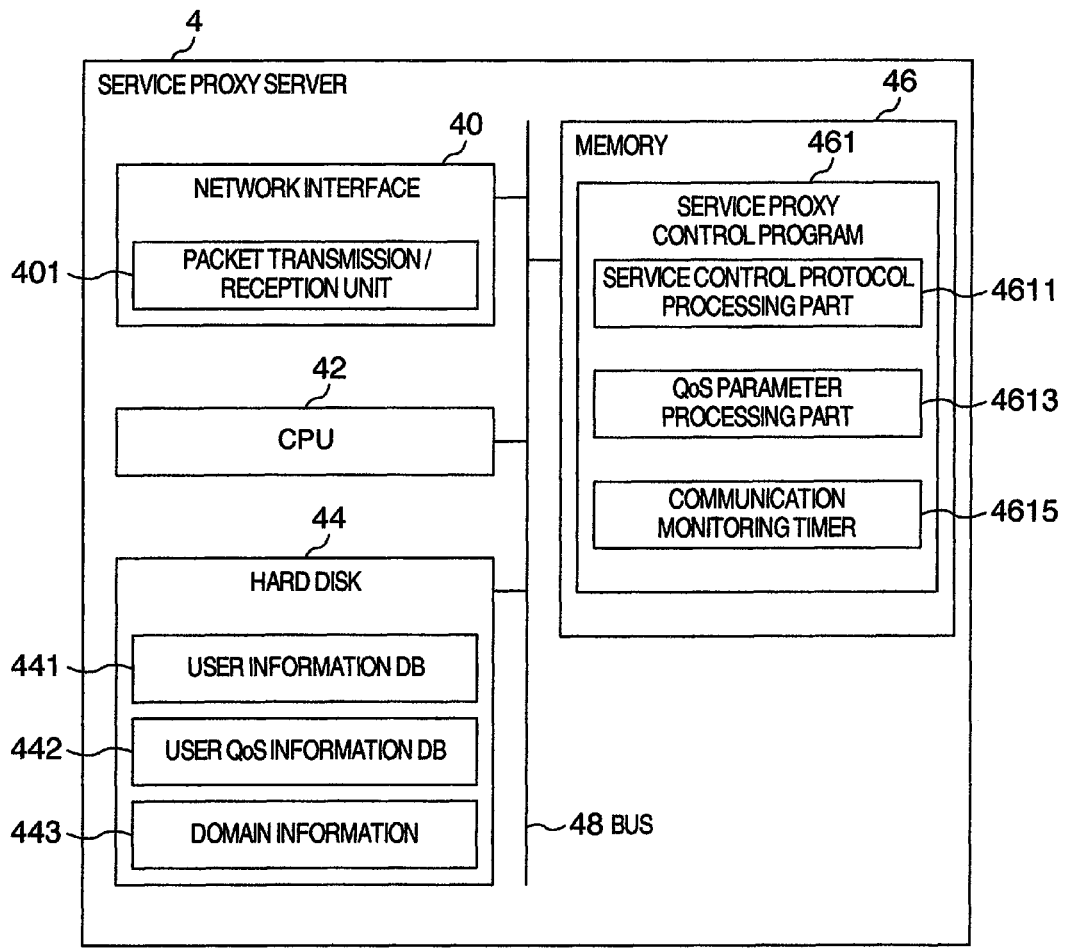
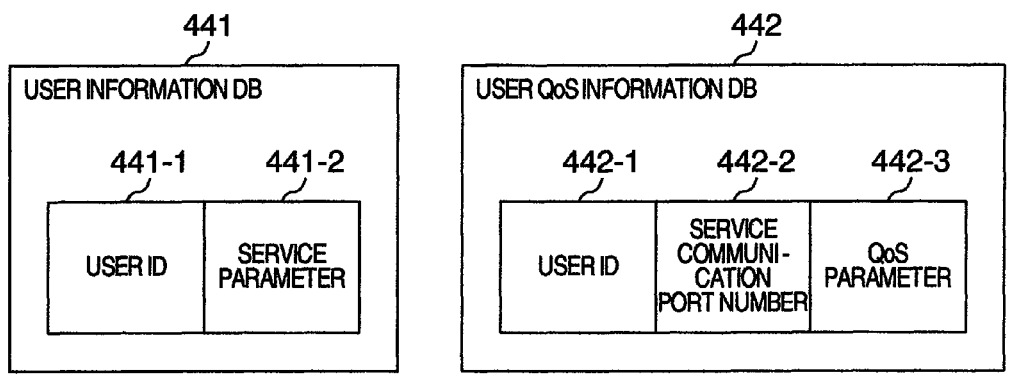

FIG.6
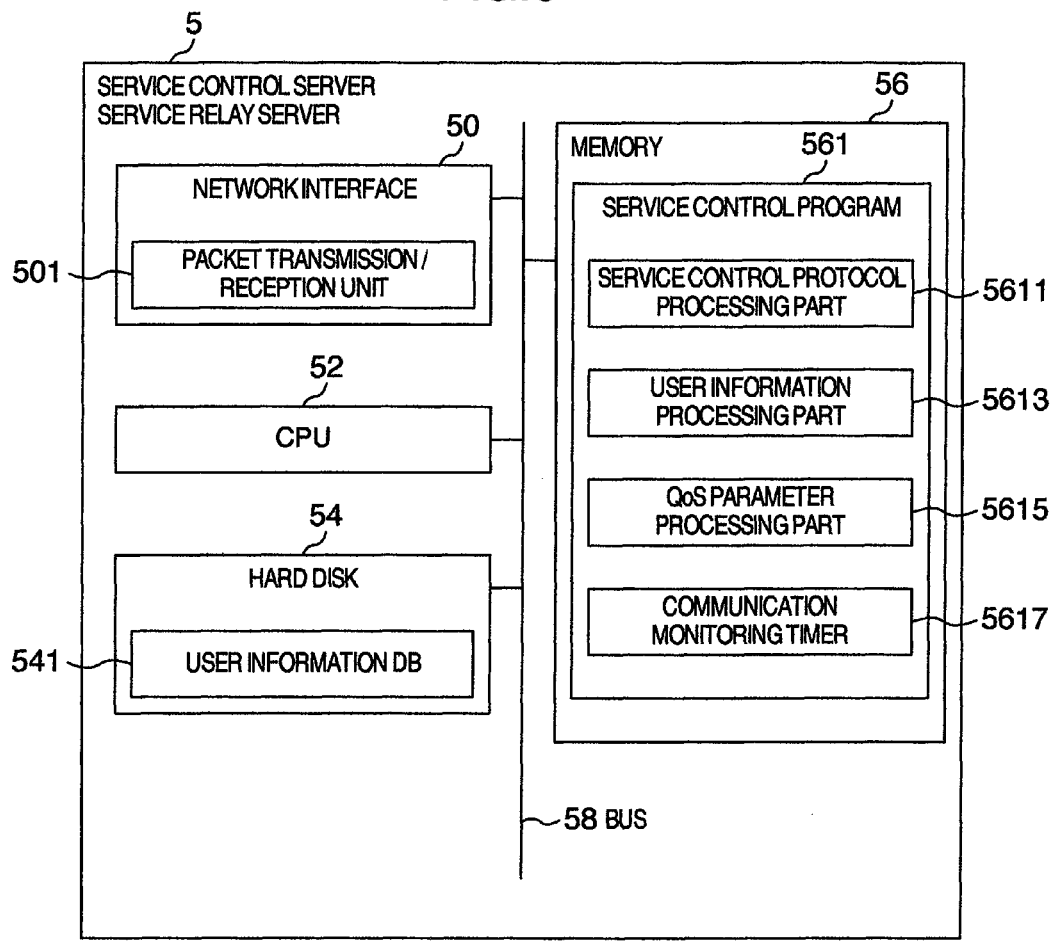
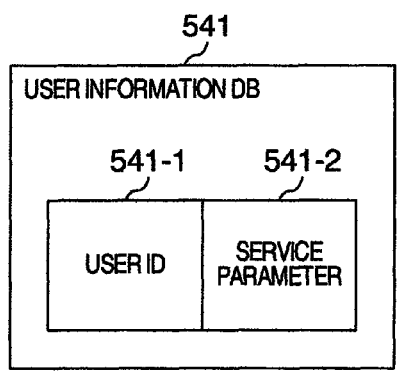

FIG.7
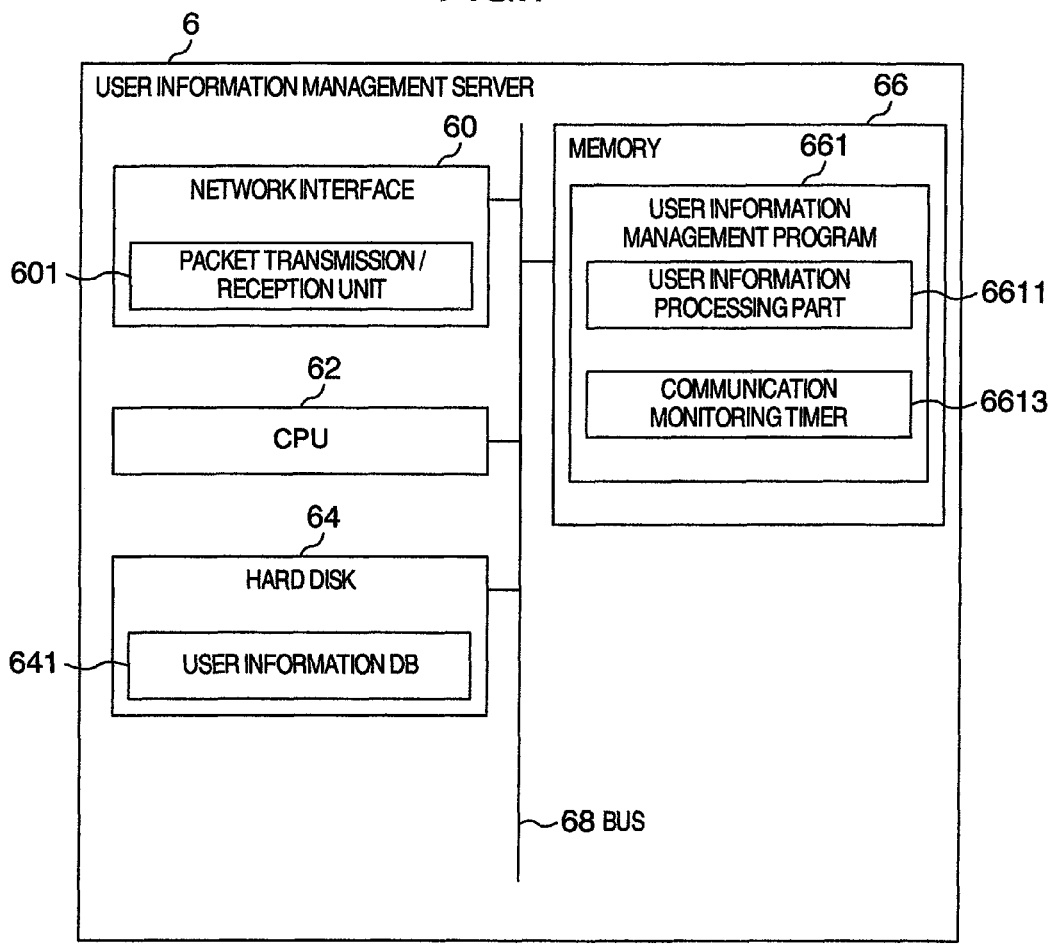
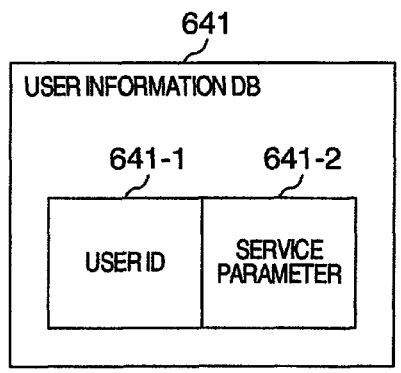

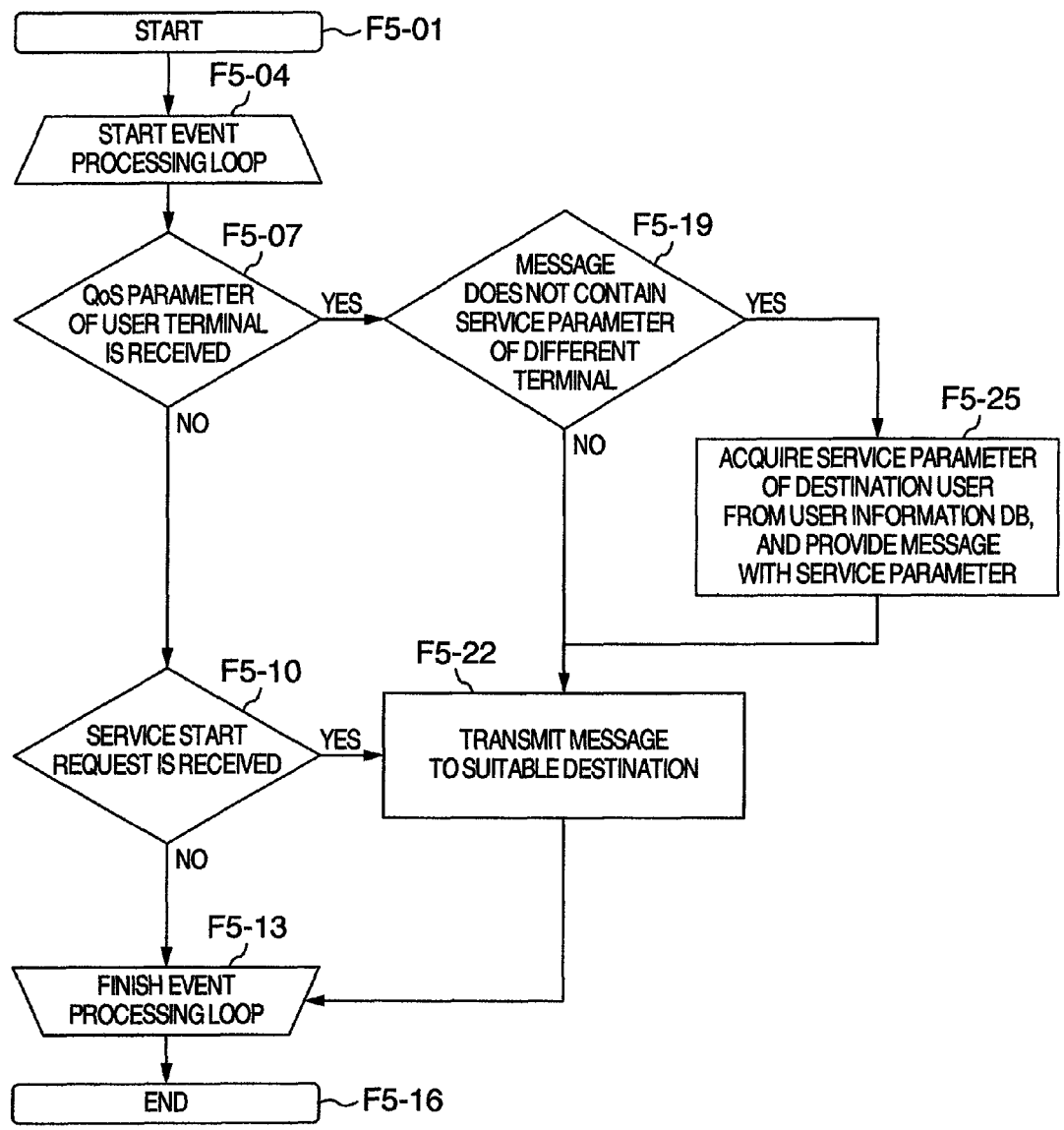

FIG.16

| | | | | | | |
|---|---|---|---|---|---|---|
| PF-01 | PACKET CLASSIFICATION (SERVICE START REQUEST) | DESTINATION USER ID | TRANSMISSION ORIGIN USER ID | SERVICE COMMUNICATION PORT NUMBER | | |
| PF-02 | PACKET CLASSIFICATION (QoS PARAMETER) | DESTINATION USER ID | TRANSMISSION ORIGIN USER ID | SERVICE COMMUNICATION PORT NUMBER | QoS PARAMETER | |
| PF-03 | PACKET CLASSIFICATION (QoS PARAMETER) | DESTINATION USER ID | SERVICE PARAMETER | TRANSMISSION ORIGIN USER ID | SERVICE COMMUNICATION PORT NUMBER | QoS PARAMETER |
| PF-04 | PACKET CLASSIFICATION (RESOURCE SECURING REQUEST) | USER ID | SERVICE COMMUNICATION PORT NUMBER | REQUESTED RESOURCE INFORMATION | | |
| PF-05 | PACKET CLASSIFICATION (RESOURCE SECURING REQUEST) | USER ID | SERVICE COMMUNICATION PORT NUMBER | REQUESTED RESOURCE INFORMATION | | |
| PF-06 | PACKET CLASSIFICATION (RESOURCE INFORMATION INQUIRY) | USER ID | | | | |
| PF-07 | PACKET CLASSIFICATION (RESOURCE INFORMATION) | USER ID | SERVICE PARAMETER | USED RESOURCE INFORMATION | | |
| PF-08 | PACKET CLASSIFICATION (RESOURCE SECURING RESULT) | USER ID | RESOURCE SECURING INFORMATION | | | |
| PF-09 | PACKET CLASSIFICATION (RESOURCE SECURING RESULT NOTICE) | USER ID | RESOURCE SECURING INFORMATION | | | |

COMMUNICATION QUALITY CONTROL SYSTEM

TECHNICAL FIELD

The present invention relates to improvement of a system for controlling the communication quality.

BACKGROUND ART

As seen in the spread of the portable telephone and notebook computer, terminals owned by users are being downsized steadily, and research and development of the mobile communication network and its standardization activity are being promoted. Principal service in the mobile communication network is audio or video talking between two parties. Standardization activities of various elemental techniques in the mobile communication network such as communication and service control are being conducted in 3GPP (3rd Generation Partner Project) and 3GPP2 (3rd Generation Partner Project 2) (see, for example, 3GPP2 X. 0013-002-0, X. 0013-012-0 Draft version 0.17.0). One of these elemental techniques is communication quality control in two-party talking service. A communication quality control method discussed in the standardization activities is as follows: when establishing one service communication session between users, a user declares information of communication resources needed in the service to a server which controls the communication quality, and the communication quality management server makes a decision whether the resources can be acquired.

SUMMARY

In the conventional art, the communication quality management server manages information concerning resources which have already been used in the network at the present time. When a user has requested to secure resources, the communication quality management server permits resource acquisition if there are spare network resources. Under such specifications, a single user can continue to acquire resources as long as there are spare network resources. This means that a small number of users can make a monopoly of resources.

In the 3GPP and 3GPP2, the HSS (home subscriber server) is prescribed as an apparatus which manages information concerning user service. For example, a method for providing the HSS with an upper limit value of resources which can be utilized by users as information is conceivable. However, a method for applying user information managed by the HSS to the communication quality control is not prescribed. In a communication quality control system according to the present invention, therefore, the above-described problems are solved by the following scheme. In processing for transmitting resource information from a user to a user of opposite party, a service relay server or a service control server which is present on a communication path of a resource information message adds service subscription information concerning users of a network to which the service relay server or the service control server belongs, to the message. When the resource information message passes through a service proxy server which is present on the communication path, a value of the added service subscription information is stored in a storage medium and the added service subscription information is removed from the message by the service proxy server. When a communication quality management server inquires of the service proxy server about a utilization situation of resources in the resource securing processing, the service subscription information stored in the service proxy server is transmitted to the communication quality management server together with the utilization situation of network resources. As a result, the communication quality management server can conduct communication quality control processing in view of both the utilization situation of network resources and the service subscription information of users.

According to the present invention, therefore, it is possible to prevent a small number of users from making a monopoly of resources by referring to the utilization situation of network resources and service information of users at the time of resource securing processing and reflecting the upper limit value of network resources which can be used by one user to the resource securing processing.

BRIEF DESCRIPTION OF DRAWINGS

FIG. 4 is a functional block diagram of a QoS control server;

FIG. 5 is a functional block diagram of a service proxy server;

FIG. 6 is a functional block diagram of a service control server and a service relay server;

FIG. 7 is a functional block diagram of a user information management server;

FIG. 15 is a flow chart of the service control server and the service relay server; and FIG. 16 is a list of packet formats.

DESCRIPTION OF THE PREFERRED EMBODIMENTS

Hereafter, an embodiment of the present invention will be described with reference to accompanying drawings.

Figure 1:
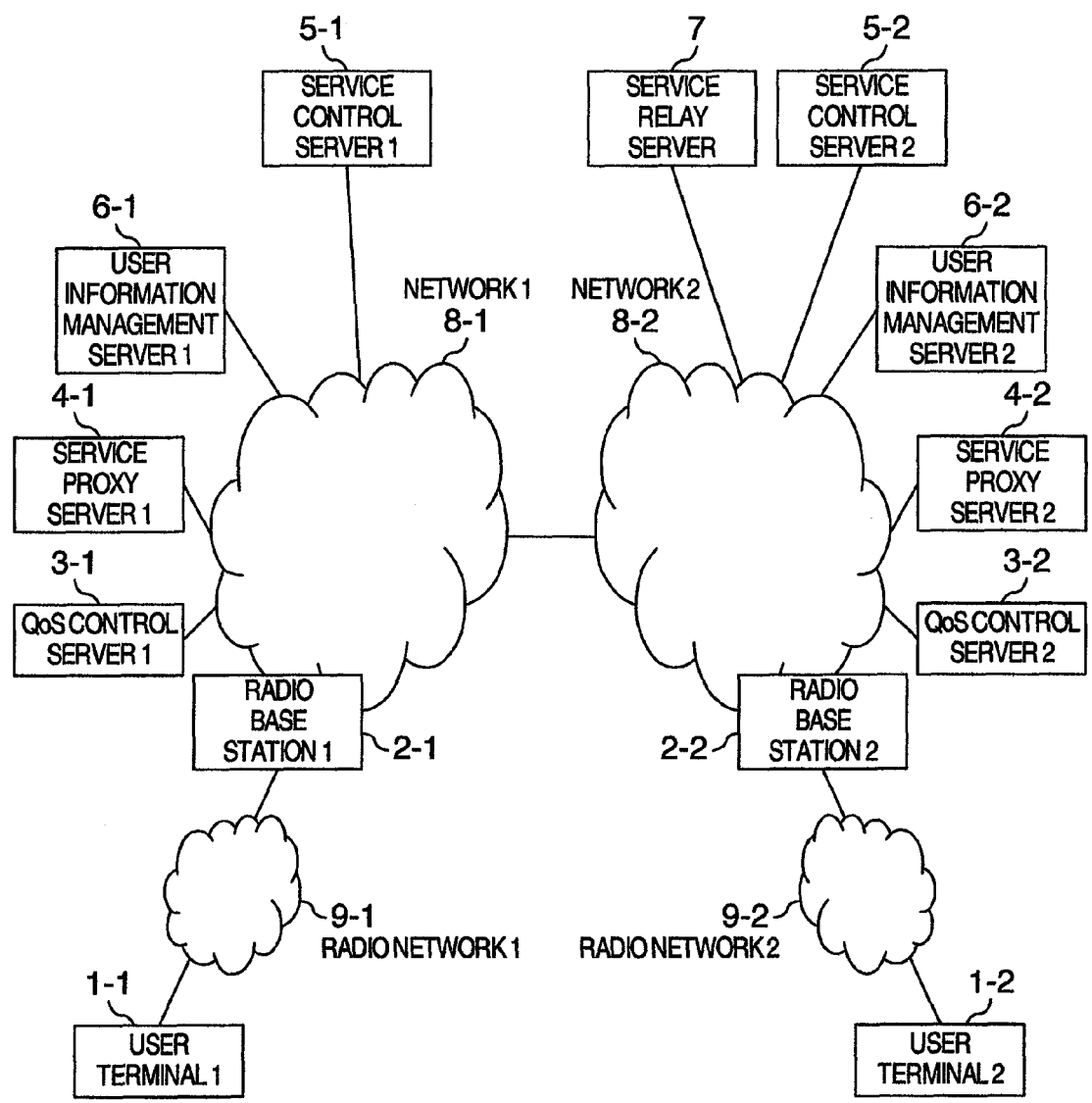
FIG. 1 is a network configuration diagram of a communication quality control system showing an embodiment of the present invention.

FIG. 1 shows an example of a system to which the present invention is applied, and it is a configuration diagram of a communication quality control system including a plurality of networks. The communication quality control system includes user terminals (1-1, 1-2) for providing a service communication function between users, radio base stations (2-1, 2-2) each disposed at a boundary between a radio network and a wire network to control radio communication, QoS control servers (3-1, 3-2) for controlling the communication quality, service proxy servers (4-1, 4-2) for transferring a service control message transmitted by a user to a service control server, a service relay server (7) for relaying a message between service control servers in two different networks, service control servers (5-1, 5-2) for exercising service control on the basis of service information of users, user information management servers (6-1, 6-2) for managing subscriber information concerning user service, a plurality of radio networks (9-1, 9-2), and a plurality of networks (8-1, 8-2).

The user terminals (1-1, 1-2) have a function of starting service, a function of responding to a service start request of a user of opposite party, and a function of requesting the QoS control server to secure resources. The user terminals (1-1, 1-2) are devices operated directly by the user. The radio base stations (2-1, 2-2) exercise control of radio communication in the radio networks, and conducts connection between a radio network and a wire network. Upon receiving a request from a user, the radio base stations (2-1, 2-2) secure resources in a radio section. The QoS control servers (3-1, 3-2) have a function of receiving a resource securing request from a user, acquiring the resource utilization situation and user service information from the service proxy server, and making a decision whether resources can be secured. The service proxy servers (4-1, 4-2) relay service control messages received from the user terminals (1-1, 1-2) to the service control servers (5-1, 5-2), respectively, and relay service control messages received from the service control servers (5-1, 5-2) to the user terminals (1-1, 1-2), respectively. The service control servers (5-1, 5-2) are servers which control service communication in networks to which users belong to, and the user terminals (1-1, 1-2) need to register information required for service control in the service control servers (5-1, 5-2). Information retained by the user terminals (1-1, 1-2) is restrictive information such as the terminal address and port number used in communication. All user information is managed by the user information management servers (6-1, 6-2) disposed in respective networks so as to be paired with the service control servers (5-1, 5-2). The service relay server (7) relays service control messages between the service control servers (5-1, 5-2) belonging to different networks (8-1, 8-2). It is disclosed in Non-Patent Document 1 that the service control servers (5-1, 5-2) inquire of the user information management apparatuses (6-1, 6-2) about user information in registration processing of the user terminals (1-1, 1-2) and the service relay server (7) inquires of the user information management servers (6-1, 6-2) about user information in relay processing of the service start message.

Figure 2:
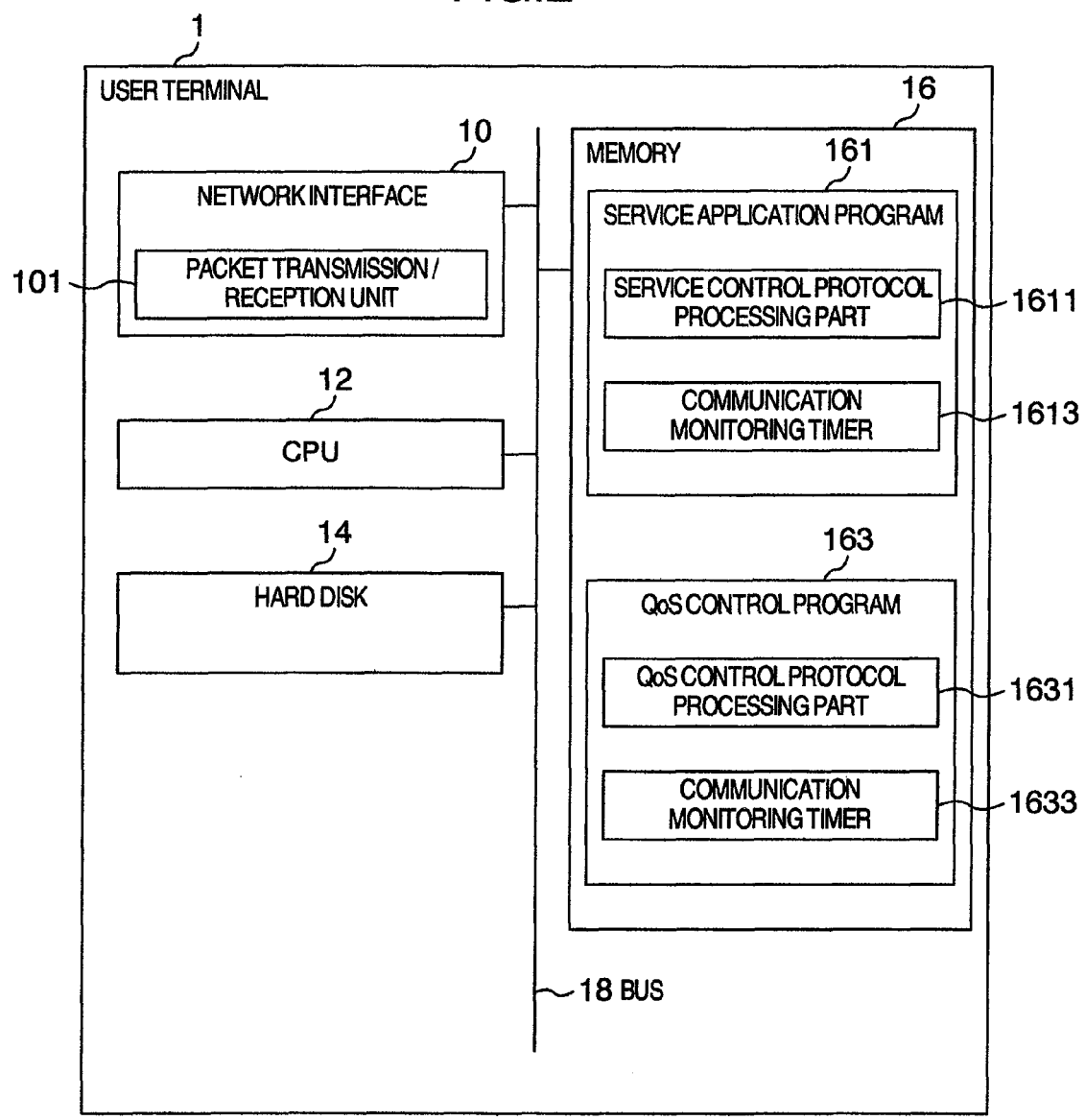
FIG. 2 is a functional block diagram of a user terminal.

Detailed configurations of respective devices will now be described. FIG. 2 is a functional block diagram of the user terminal 1. The user terminal 1 has a basic hardware configuration including a network interface 10, a CPU 12, a hard disk 14, a memory 16 and a bus 18. The user terminal 1 conducts communication with an external network via a packet transmission/reception unit 101 on the network interface 10. A service application program 161 which provides the user with a service function and a QoS control program 163 having a resource securing function are mounted on the memory 16. The service application program 161 includes a service control protocol processing part 1611 for providing functions of service start, response to a user terminal of opposite party and service end, and a communication monitoring timer 1613 for monitoring the communication situation and conducting timeout processing as occasion demands. The QoS control program 163 includes a QoS protocol processing part 1631 for the resource control function, and a communication monitoring timer 1633 for monitoring the communication situation and conducting timeout processing as occasion demands.

Figure 3:
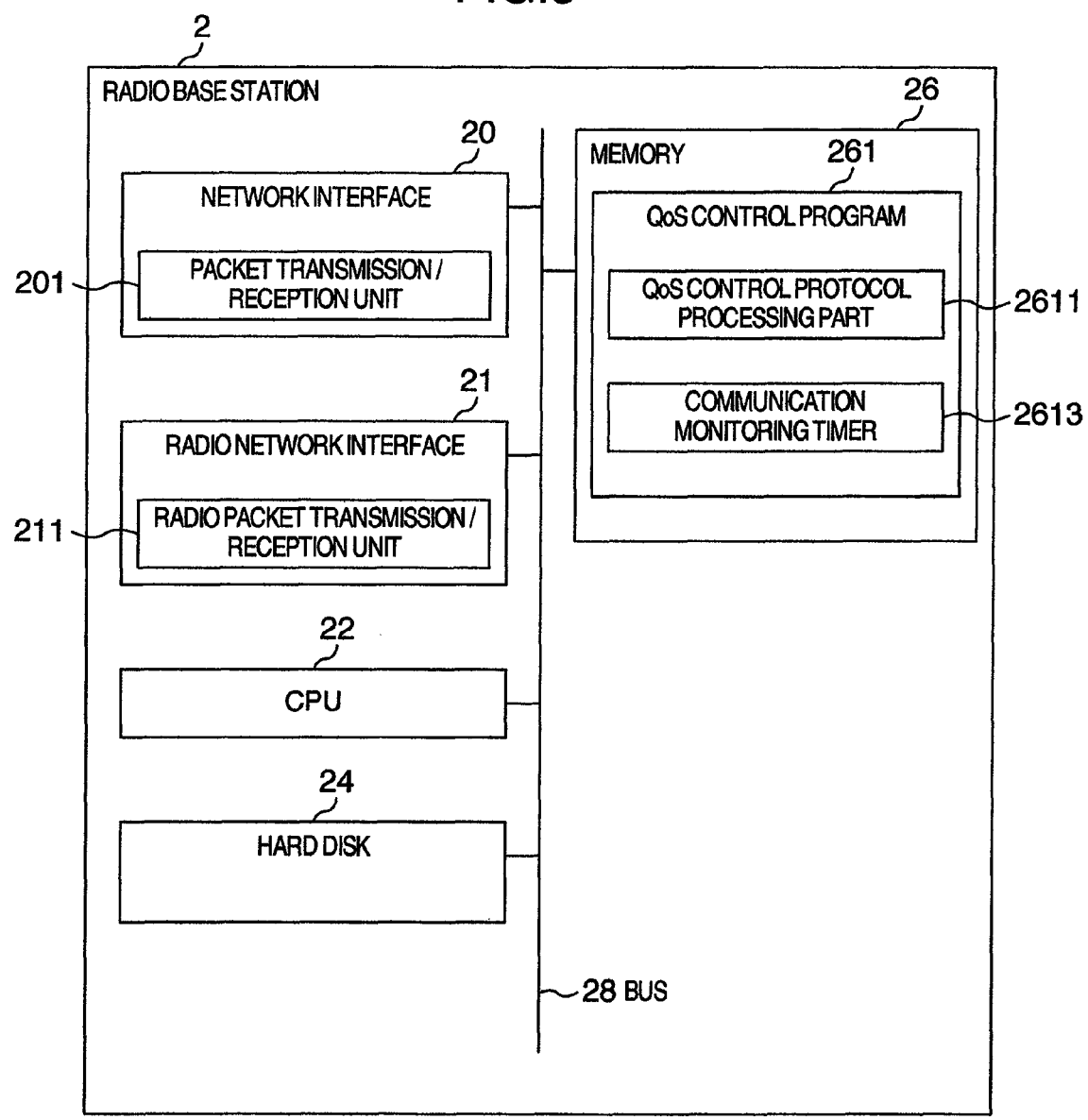
FIG. 3 is a functional block diagram of a radio base station.

FIG. 3 is a functional block diagram of the radio base station 2. The radio base station 2 has a basic hardware configuration including a network interface 20, a radio network interface 21, a CPU 22, a hard disk 24, a memory 26 and a bus 28. The radio base station 2 conducts communication with an external network via a packet transmission/reception unit 201 on the network interface 20 and a radio packet transmission/reception unit 211 on the radio network interface 21. A QoS control program 261 having a resource securing function is mounted on the memory 26. The QoS control program 261 includes a QoS protocol processing part 2611 for a resource control function and a communication monitoring timer 2613 for monitoring the communication situation and conducting timeout processing as occasion demands.

FIG. 4 is a functional block diagram of the QoS control server 3. The QoS control server 3 has a basic hardware configuration including a network interface 30, a CPU 32, a hard disk 34, a memory 36 and a bus 38. The QoS control server 3 conducts communication with an external network via a packet transmission/reception unit 301 on the network interface 30. A QoS control program 361 having a resource securing function is mounted on the memory 36. The QoS control program 361 includes a QoS protocol processing part 3611 for a resource control function and a communication monitoring timer 3613 for monitoring the communication situation and conducting timeout processing as occasion demands. A user resource information DB 341 for managing the resource utilization situation of users and a network resource information DB 342 for managing the resource utilization situation of networks are mounted on the hard disk 34. The user resource information DB 341 includes a user ID (341-1) and requested resources (341-2) as its components. The network resource information DB 342 includes maximum resources (342-1) and resources in use (342-2), as its components. Reading and writing of the user resource information DB 341 and the network resource information DB 342 are conducted by the QoS control program 361 loaded on the memory 36. The user resource information DB 341 and the network resource information DB 342 are stored in the memory 36 in some cases according to the amount of data.

FIG. 5 is a functional block diagram of the service proxy server 4. The service proxy server 4 has a basic hardware configuration including a network interface 40, a CPU 42, a hard disk 44, a memory 46 and a bus 48. The service proxy server 4 conducts communication with an external network via a packet transmission/reception unit 401 on the network interface 40. A service proxy control program 461 having a service session control function is mounted on the memory 46. The service proxy control program 461 includes a service control protocol processing part 4611 for conducting relay processing of various service control messages, a QoS parameter processing part 4613 for processing the resource information in the service control message, and a communication monitoring timer 4615 for monitoring the communication situation and conducting timeout processing as occasion demands. The hard disk 44 stores a user information DB 441 for storing information concerning resource utilization permission quantities of users, a user QoS information DB 442 for storing information concerning resources which are now being utilized by users, and domain information 443 for representing a domain to which the service proxy server belongs. The user information DB 441 includes a user ID (441-1) and a service parameter (441-2) which represents a resource utilization permission quantity, as its components. The user QoS information DB 442 includes a user ID (442-1), a service communication port number (442-2) for identifying a service session which is being used by the user, a QoS parameter (442-3) for indicating the utilization situation of resources, as its components. The domain information 443 includes a domain ID (443-1) as its component. Reading and writing of the user information DB 441, the user QoS information DB 442 and the domain information 443 are conducted by the service proxy control program 461 loaded on the memory 46.

The user information DB 441, the user QoS information DB 442 and the domain information 443 are stored in the memory 46 in some cases according to the amount of data.

FIG. 6 is a functional block diagram of the service control server 5. The service relay server 7 also has similar functional blocks. The service control server 5 has a basic hardware configuration including a network interface 50, a CPU 52, a hard disk 54, a memory 56 and a bus 58. The service control server 5 conducts communication with an external network via a packet transmission/reception unit 501 on the network interface 50. A service control program 561 having a service session control function is mounted on the memory 56. The service proxy control program 561 includes a service control protocol processing part 5611 for conducting relay processing of various service control messages, a user information processing part 5613 for acquiring user information from the user information management server, a QoS parameter processing part 5615 for processing resource information contained in the service control message, and a communication monitoring timer 5617 for monitoring the communication situation and conducting timeout processing as occasion demands. The hard disk 54 stores a user information DB 541 for storing information concerning resource utilization permission quantities of users. The user information DB 541 includes a user ID (541-1) and a service parameter (541-2) which represents a resource utilization permission quantity, as its components. Reading and writing of the user information DB 541 are conducted by the service control program 561 loaded on the memory 56. The user information DB 541 is stored in the memory 56 in some cases according to the amount of data.

FIG. 7 is a functional block diagram of the user information management server 6. The user information management 6 has a basic hardware configuration including a network interface 60, a CPU 62, a hard disk 64, a memory 66 and a bus 68. The user information management server 6 conducts communication with an external network via a packet transmission/reception unit 601 on the network interface 60. A user information management program 661 having a user information management function is mounted on the memory 66. The user information management program 661 includes a user information processing part 6611 for providing user information in response to a request from the service relay server 7, and a communication monitoring timer 6613 for monitoring the communication situation and conducting timeout processing as occasion demands. The hard disk 64 stores a user information DB 641 for storing user information. The user information DB 641 includes a user ID (641-1) and a service parameter (641-2) which represents a resource utilization permission quantity, as its components. Reading and writing of the user information DB 641 are conducted by the user information management program 661 loaded on the memory 66. The user information DB 641 is stored in the memory 66 in some cases according to the amount of data.

How the communication quality control processing is conducted will now be described in detail with reference to a communication sequence.

Figure 8:
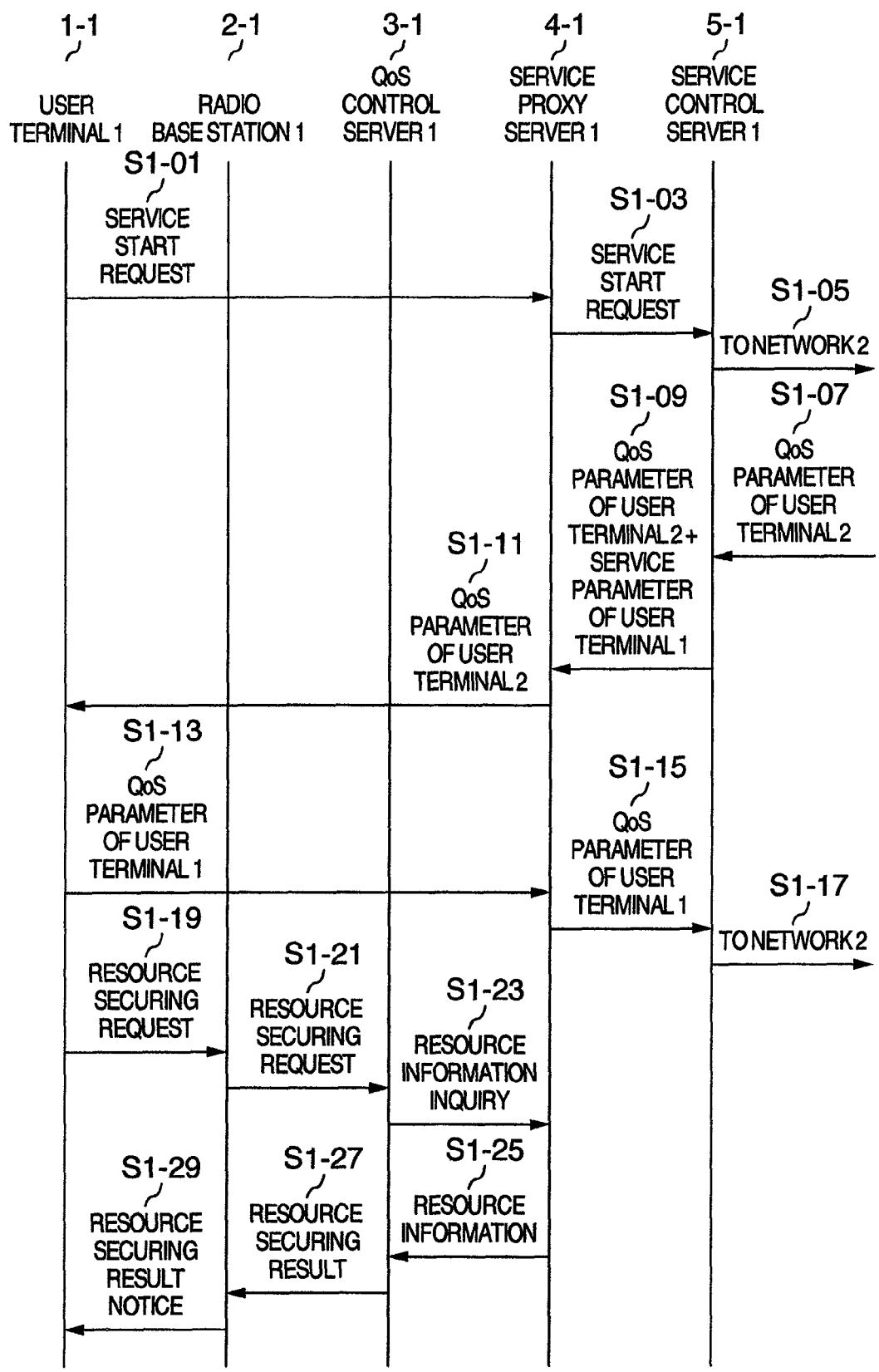
FIG. 8 is a sequence diagram for explaining communication quality control of an originating side network.

Supposing that the user terminal 1 (1-1) is an originating terminal and the user terminal 2 (1-2) is a terminating terminal, the case where the user terminal 1 starts service will now be described. FIG. 8 shows processing in the originating side network. First, the user terminal 1 (1-1) transmits a service start request toward the service proxy server 1 (4-1) (S1-01). Contents of a service start request message are shown in PF-01 in FIG. 16. The service start request message has packet classification (service start request), destination user ID, transmission origin user ID, and service communication port number as its elements. For example, in standardization activities such as 3GPP and 3GPP2, Session Initiation Protocol (SIP) is adopted as the service control protocol. Upon receiving the service start request, the proxy server 1 (4-1) relays the message to the service control server 1 (5-1) (S1-03). In the same way, the service control server 1 (5-1) relays the service start request to the service relay server (7) in the network 2 (8-2) (S1-05). As a result of response of the user terminal 2 in the network 2, the service control server 1 (5-1) receives a QoS parameter message of the user terminal 2 from the network 2 (8-2) (S1-07). Contents of the QoS parameter message are shown in PF-02 in FIG. 16. The QoS parameter message has packet classification (QoS parameter), destination user ID, transmission origin user ID, service communication port number, and QoS parameter as its elements. The QoS parameter represents resource information utilized by the user terminal in this service session. Upon receiving the QoS parameter, the service control server 1 (5-1) conducts retrieval in the user information DB 541 by using the destination user ID as a retrieval key, acquires the service parameter of the user terminal 1 (1-1), and adds the service parameter to the QoS parameter message. It is disclosed in Non-Patent Document 1 that the service parameter can be acquired beforehand because an information inquiry from the service control server 1 (5-1) to the user information management server 1 (6-1) occurs when the user terminal 1 (1-1) registers information of itself in the service control server 1 (5-1). A format of the QoS parameter message at this time is shown in PF-03 in FIG. 16. The QoS parameter message containing the service parameter of the user terminal 1 (1-1) is transmitted from the service control server 1 (5-1) to the service proxy server 1 (4-1) (S1-09). Upon receiving the message, the service proxy server 1 (4-1) acquires the service parameter of the user terminal 1 (1-1) from the QoS parameter message, and stores its value in the user information DB 441. Thereafter, the service proxy server 1 (4-1) removes the service parameter of the user terminal 1 (1-1) from the QoS parameter message, and transmits only the QoS parameter of the user terminal 2 (1-2) to the user terminal 1 (1-1) (S1-11). Upon receiving the QoS parameter of the user terminal 2 (1-2), the user terminal 1 (1-1) transmits the QoS parameter of the own terminal to the service proxy server 1 (4-1) (S1-13). The QoS parameter represents resources utilized in this service session by the user terminal 1 (1-1). Upon receiving the QoS parameter message, the service proxy server 1 (4-1) detects that service parameter information is not contained in the message, and stores the transmission origin user ID, the service communication port number and the QoS parameter in the user QoS information DB 442. Thereafter, the QoS parameter message is transmitted to the network 2 (8-2) via the service control server (5-1) (S1-15, 17). Upon transmitting the QoS parameter message, the user terminal 1 (1-1) transmits a resource securing request message to the radio base station 1 (1-1) (S1-19). Contents of the resource securing request message are shown in PF-04 in FIG. 16. The resource securing request message has packet classification (resource securing request), user ID, service communication port number, and requested resource information as its elements. Upon receiving the resource securing request message, the radio base station 1 (1-1) transmits the resource securing request message to the QoS control server (3-1) (S1-21). Contents of the resource securing request message are shown in PF-05 in FIG. 16. The resource securing request message has packet classification (resource securing request), user ID, service communication port number, and requested resource information as its elements. Upon receiving the resource securing message, the QoS control server (3-1) stores the user ID and resources requested by the user into the user resource information DB (341). In order to acquire information of resources which are being utilized by the user and the utilization situation of network resources, the QoS control server (3-1) transmits a resource information inquiry message to the service proxy server (4-1) (S1-23). Contents of the resource information inquiry message are shown in PF-06 in FIG. 16. The resource information inquiry message has packet classification (resource information inquiry) and user ID as its elements. Upon receiving the resource information inquiry message, the service proxy server (4-1) conducts retrieval in the user information DB (441) and the user QoS information DB (442) by using the user ID as a retrieval key. As a result of this processing, the service parameter of the user stored at the step S1-09 is obtained from the user information DB (441). The service parameter indicates an upper limit value of resources which can be used by the user. Furthermore, all QoS parameters which are being utilized by the user, i.e., resource information is obtained from the user QoS information DB. The service proxy server (4-1) makes the resource information message include the sum total value of the service parameter of the user and the information of resources which are being utilized and transmits a resultant resource information message to the QoS control server (3-1) (S1-25). Contents of the resource information message are shown in PF-07 in FIG. 16. The resource information message has packet classification (resource information), user ID, service parameter, and used resource information as its elements. Upon receiving the resource information message, the QoS control server (3-1) conducts retrieval in the user resource information DB by using the user ID as a retrieval key, and acquires resources requested by the user. If the sum total of resources requested by the user and the used resource information in the resource information message does not exceed the service parameter in the resource information message and the sum total of requested resources and the resources which are being utilized in the network resource information DB (342) does not exceed the maximum resources in the network resource information DB, then the QoS control server permits the user to secure resources. Otherwise, the QoS control server does not permit the user to secure resources. After making a decision about resource securing, the QoS control server (3-1) adds resources secured in this processing to the resources which are being utilized in the network resource information DB, and transmits a resource securing result message to the radio base station 1 (2-1) (S1-27). If securing of resources has failed, the network resource information DB is not updated. Contents of the resource securing result message are shown in PF-08 in FIG. 16. The resource securing result message has packet classification (resource securing result), user ID and resource securing information as its elements. If the resource securing is successful, then the resource securing information contains the secured resource information. If the resource securing fails, then the resource securing information contains information to that effect. Upon receiving the resource securing result message, the radio base station 1 (2-1) transmits a resource securing result notice message to the user terminal 1 (1-1). Contents of the resource securing result notice message are shown in PF-09 in FIG. 16. The resource securing result message has packet classification (resource securing result), user ID, and resource securing information as its elements. Contents of the resource securing information are similar to those of the resource securing result message. The resource control processing in the originating side network is completed by conducting the processing heretofore described.

Figure 9:
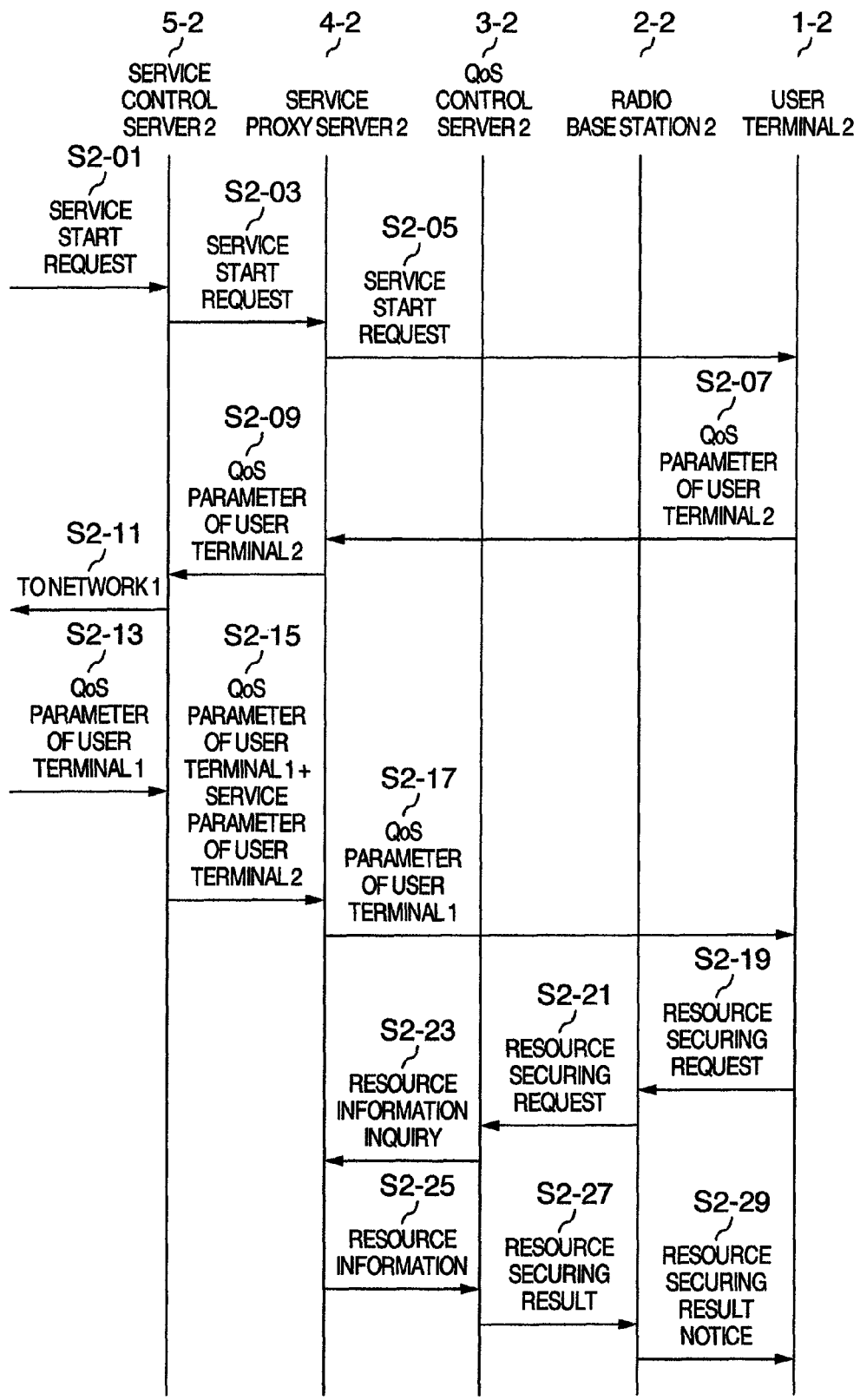
FIG. 9 is a sequence diagram for explaining communication quality control of a terminating side network.

FIG. 9 shows processing conducted in the terminating side network. A service start request message transmitted by the user terminal 1 (1-1) arrives at the service control server 2 (5-2) (S2-01). The service start request message arrives at the user terminal 2 (1-2) via the service proxy server (4-2) (S2-03, 05). Upon receiving the service start request message, the user terminal 2 (1-2) transmits the QoS parameter message which has resource information to be utilized in this service session by the own terminal as the QoS parameter, to the service proxy server 2 (4-2) (S2-07). Upon receiving the QoS parameter message, the service proxy server 2 (4-2) detects that the service parameter information is not contained in the message, stores the transmission origin user ID, the service communication port number and the QoS parameter in the QoS information DB 442, and transmits the message to the service control server 2 (5-2) (S2-09). Thereafter, the QoS parameter message is relayed to the network 1 (S2-11). As a result of this processing, the service control server 2 (5-2) receives the QoS parameter message of the user terminal 1 from the network 1 (S2-13). Upon receiving the QoS parameter, the service control server 2 (5-2) conducts retrieval in the user information DB 541 by using the destination ID as a retrieval key, acquires the service parameter of the user terminal 2 (1-2), and adds the service parameter to the QoS parameter message. The QoS parameter message containing the service parameter of the user terminal 2 (1-2) is transmitted from the service control server 2 (5-2) to the service proxy server 2 (4-2) (S2-15). Upon receiving the message, the service proxy server 2 (4-2) acquires the service parameter of the user terminal 2 (1-2) from the QoS parameter message, and stores its value in the user information DB 441. Thereafter, the service proxy server 2 (4-2) removes the service parameter of the user terminal 2 (1-2) from the QoS parameter message, and transmits only the QoS parameter of the user terminal 1 (1-1) to the user terminal 2 (1-2) (S2-17). Upon receiving the QoS parameter message of the user terminal 1, the user terminal 2 starts the resource securing processing. Processing between step S2-19 and step S2-29 is similar to the processing between the step S1-19 and the step S1-29 shown in FIG. 8.

Figure 10:
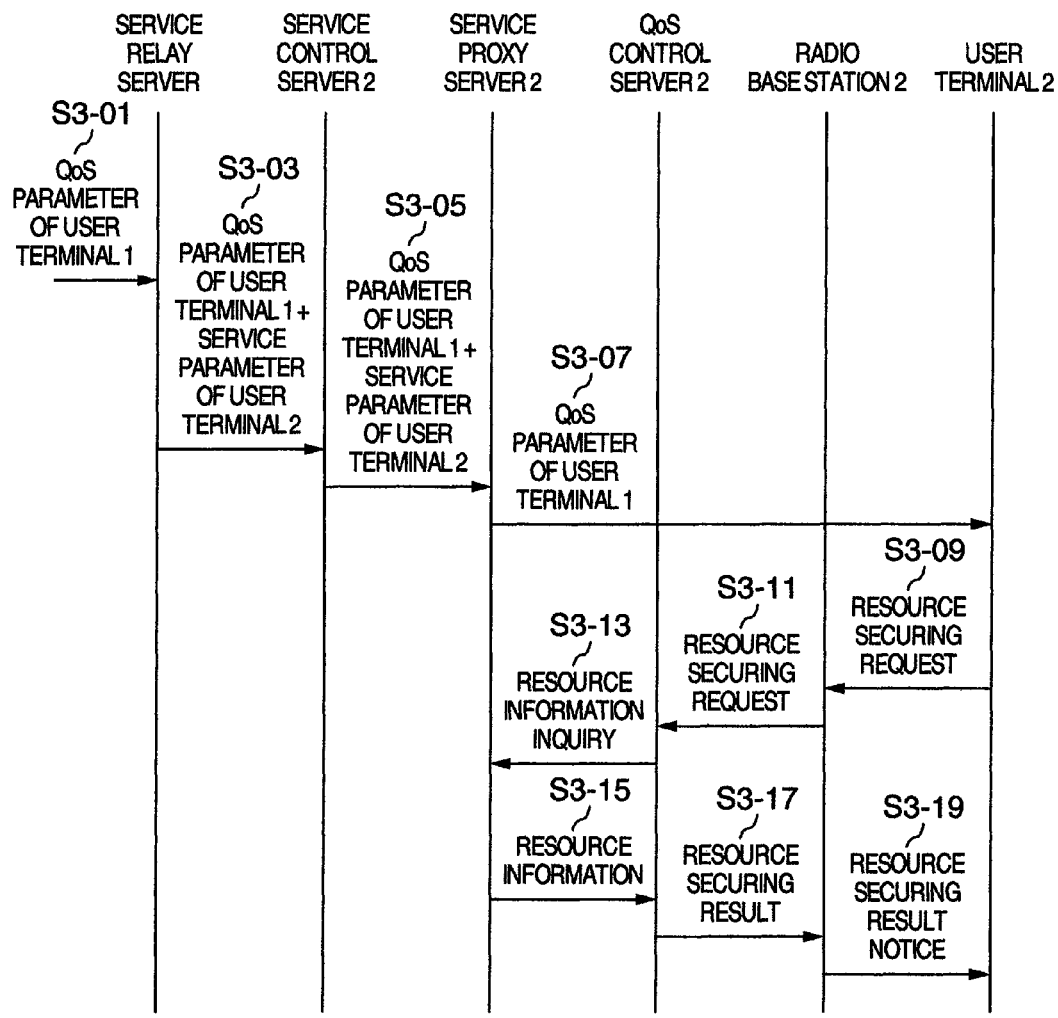
FIG. 10 is a sequence diagram for explaining communication quality control of the service relay server in the terminating side network.

FIG. 10 shows processing conducted in the case where the service relay server (7) provides a service parameter of a user in the terminating side network. The service relay server (7) is a server for conducting message relay between service control servers respectively belonging to different networks. Therefore, a message transmitted by the service control server 1 (5-1) first arrives at the service relay server (7) (S3-01). When the QoS parameter message of the user terminal 1 has arrived at the service relay server (7), therefore, it is also possible for the service relay server to provide a service parameter of the user terminal 2 (1-2). It is disclosed in Non-Patent Document 1 that the service relay server can acquire the service parameter beforehand because the service relay server inquires of the user information management server 2 (6-2) at the time of relay of the service start message. After providing the service parameter, the service relay server (7) transmits the QoS parameter message to the service control server 2 (5-2) (S3-03). The service control server 2 (5-2) scans contents of the QoS parameter message, and detects that the message is already provided with the service parameter of the user terminal 2. As a result, the QoS parameter message is transmitted to the service proxy server 2 (4-2) without being processed in the service control server 2 (5-2) (S3-05). Processing between step S3-07 and step S3-19 is similar to the processing between the step S2-17 and the step S2-29 shown in FIG. 9.

Figure 11:
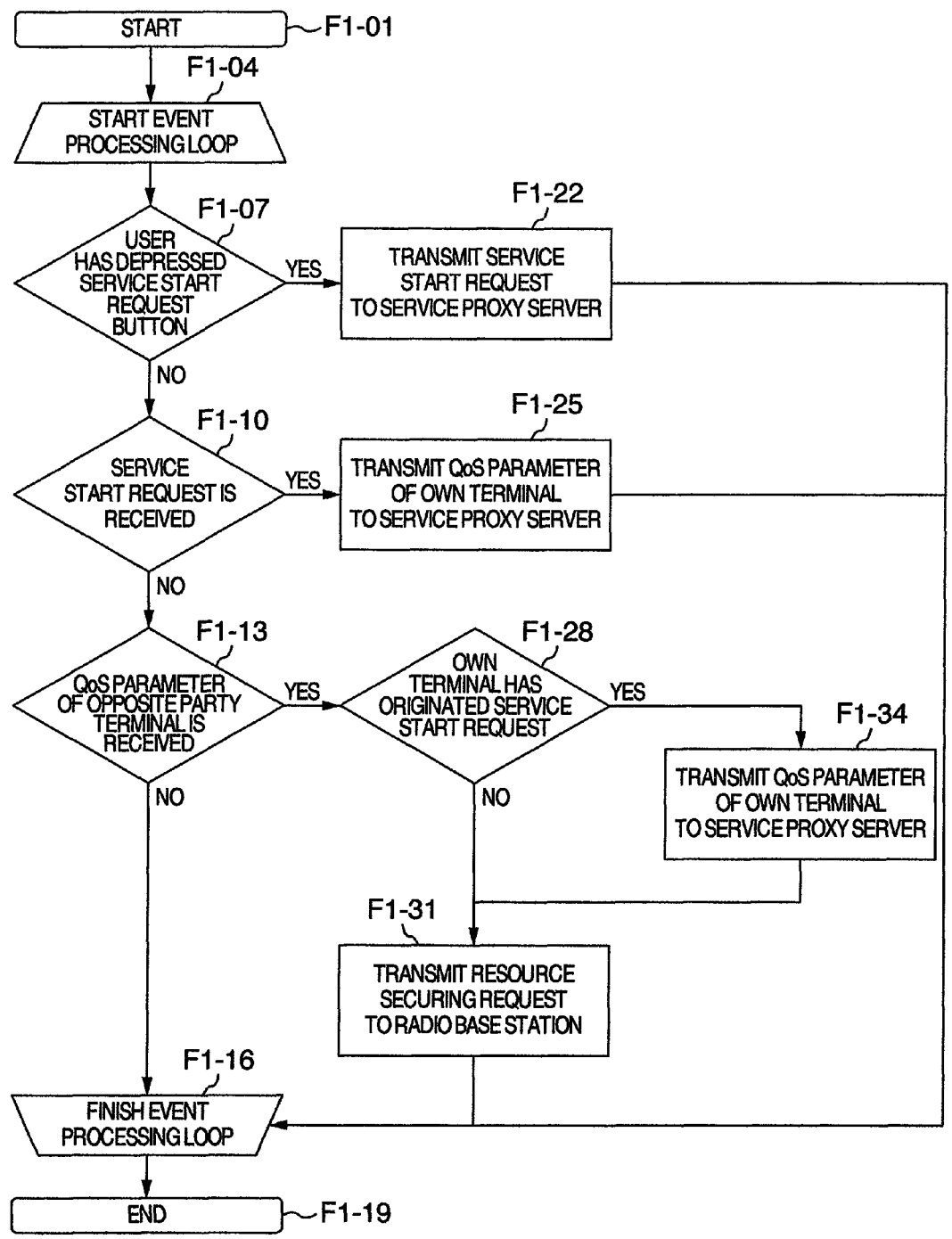
FIG. 11 is a flow chart of the user terminal.

Processing flow charts of various apparatuses in the communication quality control system will now be described. FIG. 11 is a flow chart of the user terminal (1). The user terminal (1) conducts initialization processing at the time of start, and starts an event processing loop (F1-01, 04). If user's depression of a service start request button is detected in the event processing loop (F1-07), then the user terminal (1) transmits a service start request to the service proxy server (4) (F1-22). If a service start request is received (F1-10), then the user terminal (1) transmits the QoS parameter message of the own terminal to the service proxy server (4) (F1-25). If the QoS parameter message of a user terminal of opposite party in the service session is received (F1-13) and the own terminal is the originating terminal which has originated the service start request, then the user terminal (1) transmits the QoS parameter message of the own terminal to the service proxy server (4) (F1-34). If the own terminal is a terminating terminal, then the user terminal (1) transmits the resource securing request message to the radio base station (2) (F1-31). When the user terminal (1) shuts down, the event processing loop is finished (F1-16). After the event processing loop is stopped, the user terminal (1) stops its function (F1-19).

Figure 12:
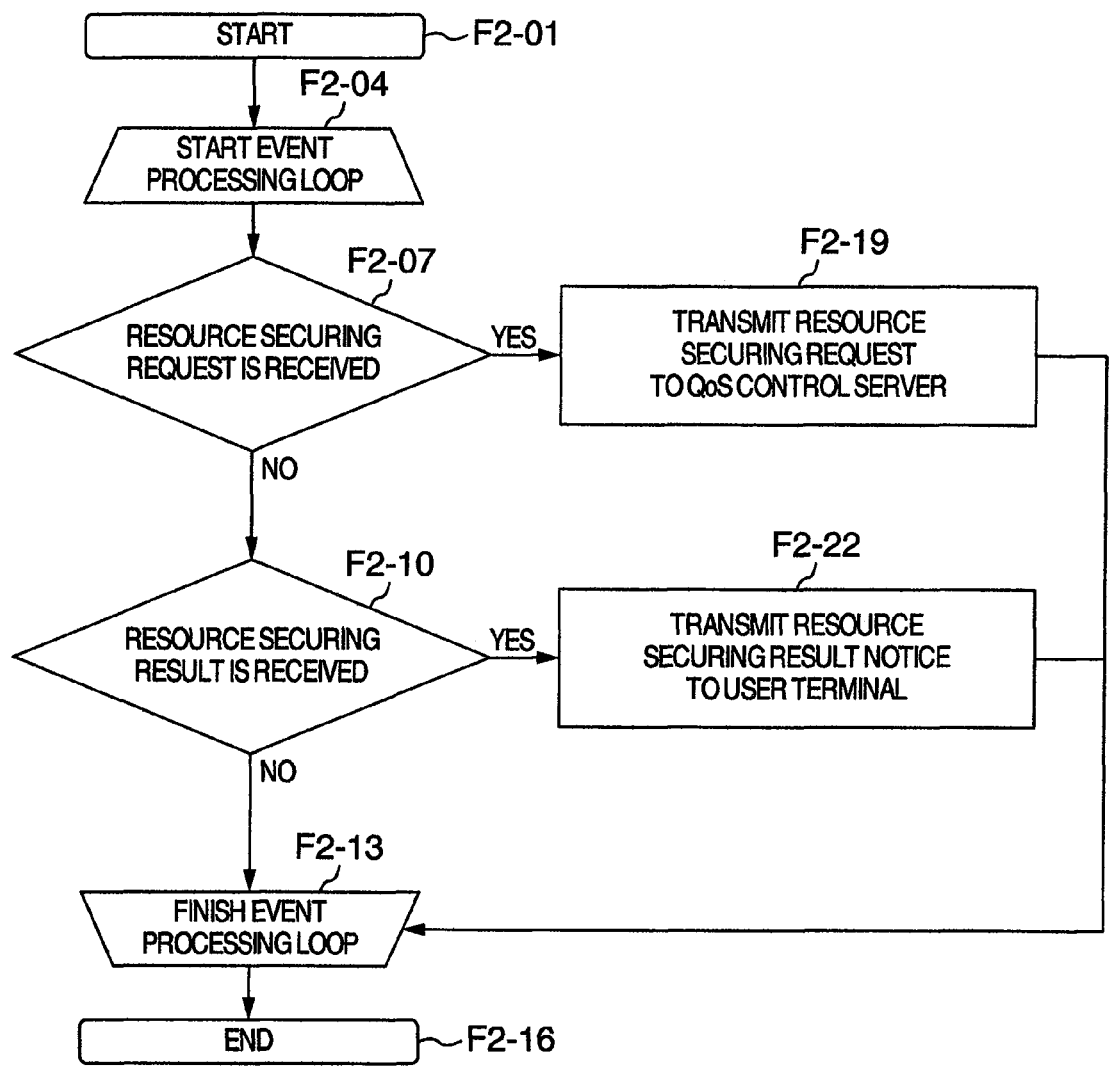
FIG. 12 is a flow chart of the radio base station.

FIG. 12 is a flow chart of the radio base station (2). The radio base station (2) conducts initialization processing at the time of start, and starts an event processing loop (F2-01, 04). If the resource securing request message is received in the event processing loop (F2-07), then the radio base station (2) transmits the resource securing request message to the QoS control server (F2-19). If the resource securing result message is received (F2-10), then the radio base station (2) transmits the resource securing result notice message to the user terminal (1) (F2-22). The event processing loop is finished when the radio base station (2) shuts down (F2-13). After the event processing loop is stopped, the radio base station (2) stops its function (F2-16).

Figure 13:
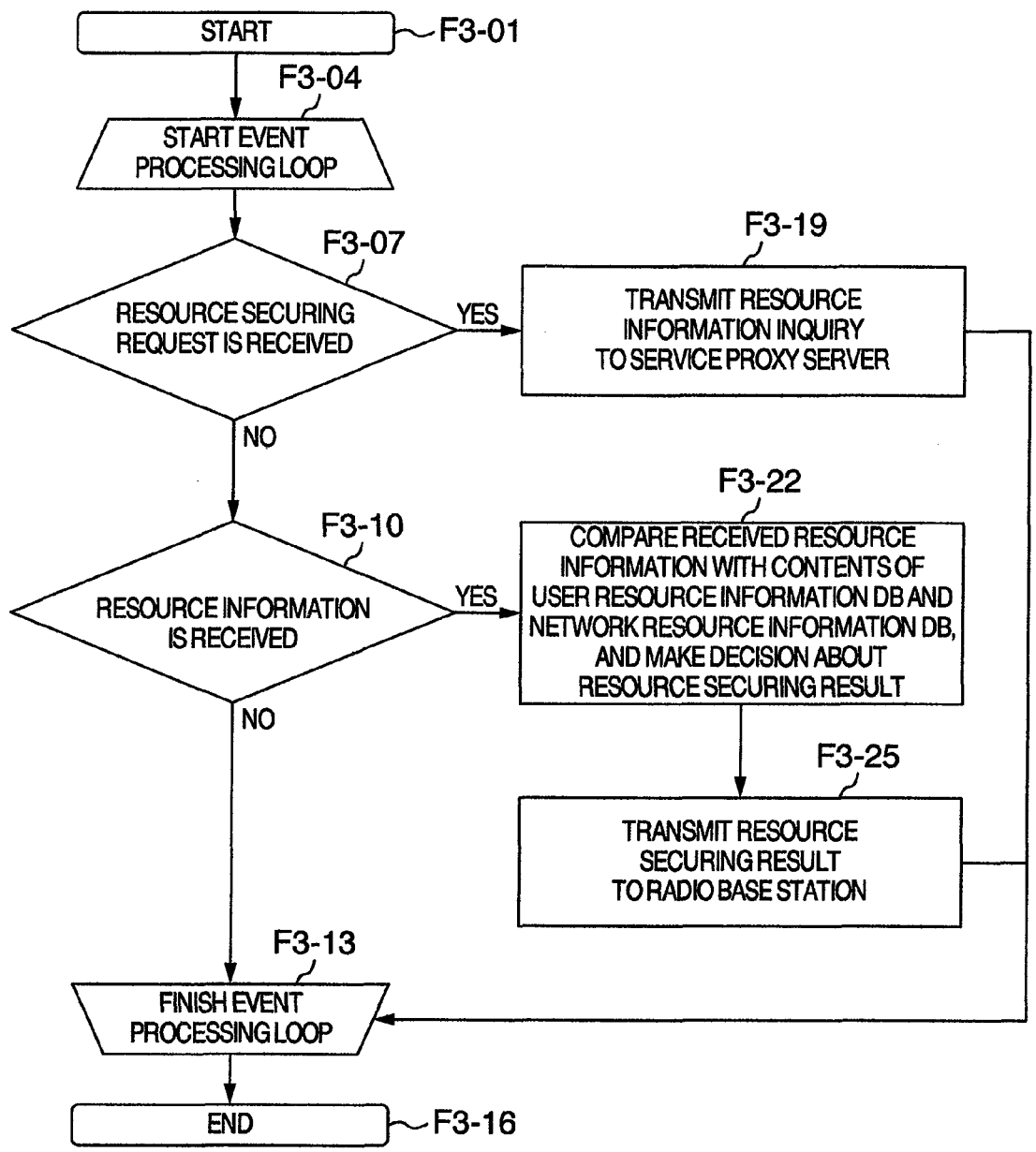
FIG. 13 is a flow chart of the QoS control server.

FIG. 13 is a flow chart of the QoS control server (3). The QoS control server (3) conducts initialization processing at the time of start, and starts an event processing loop (F3-01, 04). If the resource securing request message is received in the event processing loop (F3-07), then the QoS control server (3) transmits the resource information inquiry message to the service proxy server (4) (F3-19). If the resource information message is received, then the QoS control server (3) compares the received resource information with contents of the user resource information DB (341) and the network resource information DB (342), and transmits the resource securing result message to the radio base station (2) (F3-25). When the QoS control server (3) shuts down, the event processing loop is finished (F3-13). After the event processing loop is stopped, the QoS control server (3) stops its function (F3-16).

Figure 14:
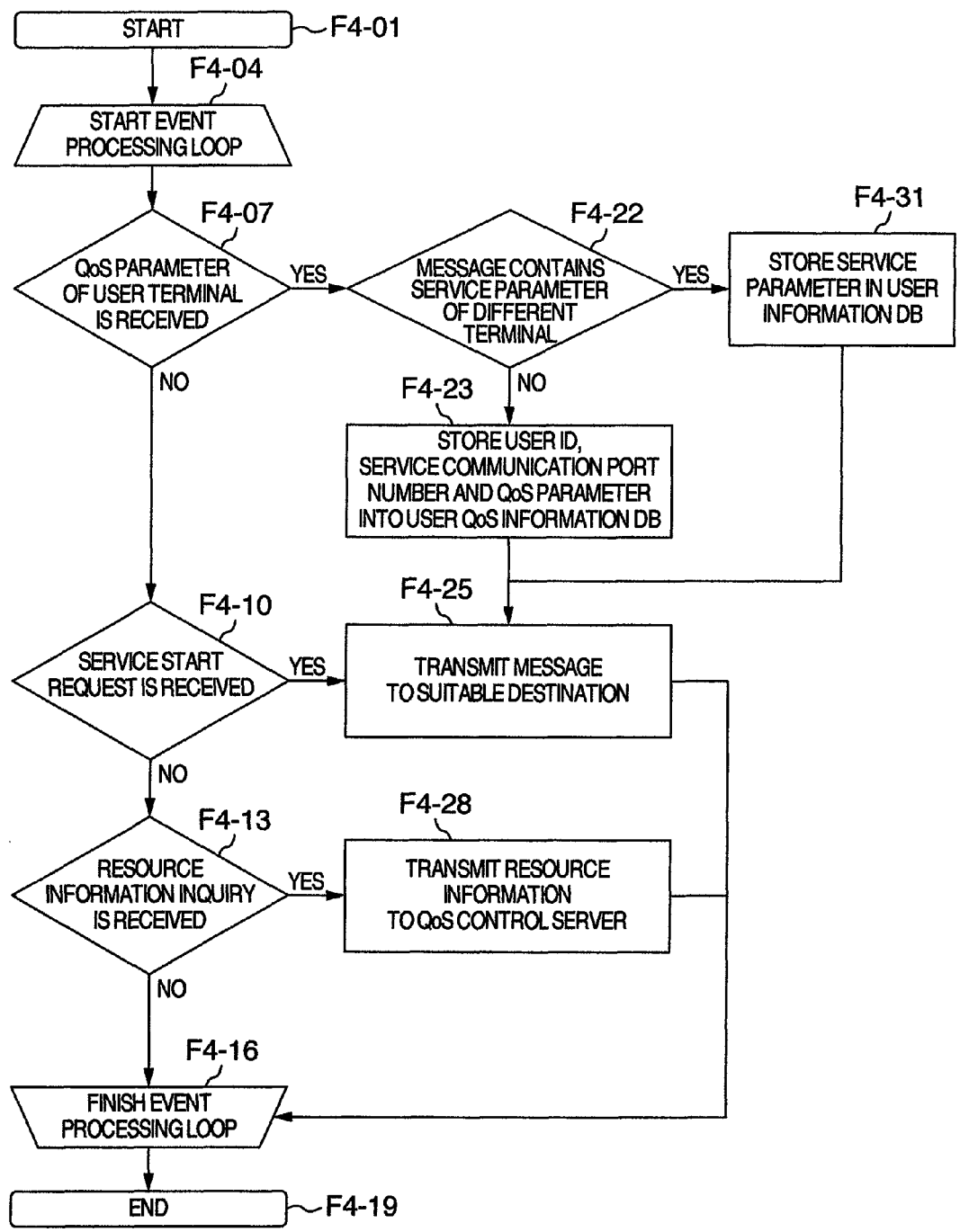
FIG. 14 is a flow chart of the service proxy server.

FIG. 14 is a flow chart of the service proxy server (4). The service proxy server (4) conducts initialization processing at the time of start, and starts an event processing loop (F4-01, 04). If the QoS parameter message of the user terminal (1) is received in the event processing loop (F4-07), then the service proxy server (4) checks whether a service parameter of a different user terminal (1) is contained in the QoS parameter message (F4-22). If the service parameter is not contained, then the service proxy server (4) stores the user ID, the service communication port number, and the QoS parameter contained in the QoS parameter message into the user QoS information DB (442) (S4-23). If the service parameter is contained, then the service proxy server (4) stores the service parameter in the user information DB (441) (F4-31). After these kinds of processing are conducted, the QoS parameter message is transmitted to a suitable destination (F4-25). Also in the case where the service start request is received (F4-10), the message is transmitted to a suitable destination in the same way. If the resource information inquiry message is received (F4-13), then the resource information message is transmitted to the QoS control server (3) (F4-28). When the service proxy server (4) shuts down, the event processing loop is finished (F4-16). After the event processing loop is stopped, the service proxy server (4) stops its function (F4-19).

FIG. 15 is a flow chart of the service control server (5) and the service relay server (7). The flow chart will now be described by taking the service control server as an example. The service control server (5) conducts initialization processing at the time of start, and starts an event processing loop (F5-01, 04). If the QoS parameter message of the user terminal (1) is received in the event processing loop (F5-07), then the service control server checks whether a service parameter of a different user terminal (1) is contained in the QoS parameter message (F5-07). If the service parameter is contained, then the QoS parameter message is transmitted to a suitable destination (F5-22). If the service parameter is not contained, then the service control server (5) acquires a service parameter of the destination user from the user information DB (541), provides the message with the service parameter of the destination user (F5-25), and then transmits the message to a suitable destination. Also in the case where a service start request is received, the message is transmitted to a suitable destination in the same way (F5-22). When the service control server (5) shuts down, the event processing loop is finished (F5-13). After the event processing loop is stopped, the service control server (5) stops its function (F5-16).

According to the above-described invention, in service control in the mobile communication network, the service control server or the service relay server acquires service subscription information registered by the user at the time of service subscription from the user information management server, prior to the service control. In the service control processing, the service control server or the service relay server causes a service control message to include user's service subscription information and transmits a resultant service control message to the service proxy server. In response to an inquiry from the QoS control server, therefore, the service proxy server can transmit the service subscription information of the user besides the utilization situation of the network resources to the QoS server. As a result, the QoS control server can conduct communication quality control processing with the service subscription information of the user besides the utilization situation of the network resources reflected.

In the communication quality control system according to the present invention, communication quality control with the service subscription information of the user reflected is implemented in the mobile communication network by the service control server, the service relay server and the service proxy server. Therefore, the communication quality control system according to the present invention can be applied to an audio-video talking system of communication quality assurance type on a mobile communication network for portable telephone.

The invention claimed is:

1. A communication quality control system which is a network system comprising a first terminal, a first radio base station accommodating the first terminal, a first QoS control server, a first user management server for managing service information of a first user of the first terminal, a first service control server, and a first service proxy server which are mutually connected in a first network, and a second terminal, a second radio base station accommodating the second terminal, a second QoS control server, a second user management server for managing service information of a user of the second terminal, a second service control server, a second service proxy server, and a service relay server for relaying a message between the first and second service control servers which are mutually connected in a second network, wherein when a QoS parameter message from the first terminal to the second terminal is received via the first network, the second service control server or the second service relay server adds service subscription information of the second user of the second terminal who utilizes service together with the first user of the first terminal to the QoS parameter message, upon receiving the QoS parameter message from the second service control server or the second service relay server, the second service proxy server records the service subscription information of the second user in a storage medium in the own apparatus, deletes the service subscription information of the second user from the QoS parameter message, and transmits a resultant QoS parameter message to the second terminal, and upon receiving a resource information inquiry message from the second QoS control server, the second service proxy server transmits the service subscription information of the second terminal recorded in the storage medium and information of resources which are being used by the second terminal to the second QoS control server, upon receiving a resource information message from the second service proxy server, the second QoS control server compares a resource parameter requested by the second user with maximum resources permitted on the basis of resources which are being used by the second user and the service subscription information of the second user, and makes a decision whether the second user can acquire resources.

2. The communication quality control system according to claim 1, wherein the service subscription information of the second user managed by the second service control server, the second service relay server and the second service proxy server contains an upper limit value of resources which can be utilized by the second user.

3. The communication quality control system according to claim 1, wherein the second service proxy server manages a communication port number utilized every service as a service communication port number, and the service communication port number contains a communication port number of TCP/IP.

4. The communication quality control system according to claim 1, wherein the QoS parameter managed by the second proxy server contains a coding form and a bit rate of voice.

5. The communication quality control system according to claim 1, wherein requested resource information of the second user managed by the second QoS control server contains a band requested by the second user.

6. A communication quality control method in a network system comprising a first terminal, a first radio base station accommodating the first terminal, a first QoS control server, a first user management server for managing service information of a first user of the first terminal, a first service control server, and a first service proxy server which are mutually connected in a first network, and a second terminal, a second radio base station accommodating the second terminal, a second QoS control server, a second user management server for managing service information of a user of the second terminal, a second service control server, a second service proxy server, and a service relay server for relaying a message between the first and second service control servers which are mutually connected in a second network, wherein when a QoS parameter message from the first terminal to the second terminal is received via the first network, the second service control server or the second service relay server adds service subscription information of the second user of the second terminal who utilizes service together with the first user of the first terminal to the QoS parameter message, upon receiving the QoS parameter message from the second service control server or the second service relay server, the second service proxy server records the service subscription information of the second user in a storage medium in the own apparatus, deletes the service subscription information of the second user from the QoS parameter message, and transmits a resultant QoS parameter message to the second terminal, and upon receiving a resource information inquiry message from the second QoS control server, the second service proxy server transmits the service subscription information of the second terminal recorded in the storage medium and information of resources which are being used by the second terminal to the second QoS control server, upon receiving a resource information message from the second service proxy server, the second QoS control server compares a resource parameter requested by the second user with maximum resources permitted on the basis of resources which are being used by the second user and the service subscription information of the second user, and makes a decision whether the second user can acquire resources.

7. The communication quality control method according to claim 6, wherein the service subscription information of the second user managed by the second service control server, the second service relay server and the second service proxy server contains an upper limit value of resources which can be utilized by the second user.

8. The communication quality control method according to claim 6, wherein the second service proxy server manages a communication port number utilized every service as a service communication port number, and the service communication port number contains a communication port number of TCP/IP.

9. The communication quality control method according to claim 6, wherein the QoS parameter managed by the second proxy server contains a coding form and a bit rate of voice.

10. The communication quality control method according to claim 6, wherein requested resource information of the second user managed by the second QoS control server contains a band requested by the second user.

* * * * *